United States Patent [19]
Weatherly et al.

[11] Patent Number: 6,023,687
[45] Date of Patent: *Feb. 8, 2000

[54] METHOD FOR CREATING AND MANAGING A LEASE AGREEMENT

[75] Inventors: James E. Weatherly, Fairfax County, Va.; Charles R. Carey, Montgomery County, Md.

[73] Assignee: Capital One Financial Corporation, Glen Allen, Va.

[ * ] Notice: This patent is subject to a terminal disclaimer.

[21] Appl. No.: 09/223,156

[22] Filed: Dec. 30, 1998

Related U.S. Application Data

[63] Continuation of application No. 08/991,112, Dec. 16, 1997.

[51] Int. Cl.$^7$ .................................................. G06F 17/60
[52] U.S. Cl. .................................. 705/38; 705/1; 705/39
[58] Field of Search .................................. 705/35, 38, 39, 705/40, 1, 4

[56] References Cited

U.S. PATENT DOCUMENTS

| | | |
|---|---|---|
| 4,774,664 | 9/1988 | Campbell . |
| 4,891,503 | 1/1990 | Jewell . |
| 5,025,138 | 6/1991 | Cuervo . |
| 5,239,462 | 8/1993 | Jones . |
| 5,262,941 | 11/1993 | Saladin . |
| 5,274,547 | 12/1993 | Zoffel . |
| 5,383,113 | 1/1995 | Kight . |
| 5,583,760 | 12/1996 | Klesse . |
| 5,611,052 | 3/1997 | Dykstra . |

OTHER PUBLICATIONS

Tarnoff, Stephen, "Judge's Ruling Widens Fiduciary Responsibility of Ceding Companies", Business Insurance, vol. 21, No. 46, p. 31 (start page), Nov. 1997.

Tarnoff, Stephen, "Insurers Guaranteeing Lease Payments", Business Insurance, vol. 18, No. 20, p. 36 (start page), May 1984.

Wollard, David A., "Lease Guarantee Insurance—Aid to Small Businessmen", Mortgage Banker, vol. 34, No. 2, p. 18 (start page), Nov. 1973.

Starr, John O., "Lease Guarantee Insurance", The Appraisal Journal, vol. 40, No. 2, p. 175 (start page), Apr. 1972.

*Primary Examiner*—Allen R. MacDonald
*Assistant Examiner*—Susanna Meinecke-Diaz
*Attorney, Agent, or Firm*—J. Michael Martinez de Andino; McGuire, Woods, Battle & Boothe

[57] ABSTRACT

A computerized system and method for creating and managing a lease agreement includes a lease control computer (14) including means (18,22) for analyzing and processing predetermined financial information regarding a potential tenant (T) and a potential landlord (L) on behalf of a lease control intermediary, means (24) for evaluating the information to determine the acceptability of the financial risk associated with potential tenant creating a service product in the form of a guaranty (30) directed to periodic lease payments from the lease control intermediary to the landlord (L) for a predetermined amount defining a guaranty limit with the guaranty limit corresponding to a predetermined lime period with the guaranty obligation becoming active upon failure of the potential lessee (T) to pay periodic lease payments: providing a lease agreement (32) for execution by the landlord (L) and tenant (T) and the least control intermediary, and means for depositing periodic lease payments received either from the tenant (T) or made by the lease control intermediary according to the service product into an account held by the landlord (L), the payments having a management fee removed therefrom by the lease control intermediary.

17 Claims, 3 Drawing Sheets

METHOD FOR CREATING AND MANAGING A LEASE AGREEMENT

This application is a continuation of application Ser. No. 08/991,112, filed Dec. 16, 1997.

The present invention relates broadly to computerized systems and methods employed thereby for property transactions and, more particularly, to a method for creating and managing a lease agreement wherein a third pat provides lease management and payment guaranties and the computerized system assesses risk management data.

Traditionally, leases of property, for example leases for houses or apartments, involve a lessor and a lessee and, more particularly, a landlord and a tenant. In creating the lease relationship and lease agreement, the landlord will typically require background information from the prospective tenant to include various types of financial information. e.g. employment information and current income. Although recommended, a credit check through an authorized credit agency may not be conducted, depending on the landlord. This is especially true with property holdings of ten units or less. Typically, these landlords may have different professions and do not make their living from leasehold interests in their property. Such landlords may lack the time or expertise to fully monitor the financial condition of their rented property with precision and regularity.

In addition, personal dealings between the landlord and tenant may give rise to the opportunity for an unscrupulous tenant to take advantage of a landlords good nature, resulting in consistently delayed rent payments or, in extreme cases, the total absence of rent payments.

Some landlords turn to property management companies, yet these companies can be expensive and their are no assurances that rent will be paid to the landlord when it is due. These property management companies may lack the resources and expertise to provide assurances that landlord will receive timely and complete rent payments. Perhaps more importantly, the management companies are under no obligation to assure landlords that they will receive the rent due.

Accordingly, there exists a need for a leasehold arrangement and method for managing the leasehold arrangement that will provide the landlord with assurances that the rent will be received in a timely manner.

The technical problem of the invention is to provide a computerized system and method which processes and stores data to enable it to carry out tasks of a control intermediary in the creation and management of a lease arrangement wherein the landlord is assured of rent payments being deposited in a landlord account in a timely manner. The system may also guarantee the landlord will receive a minimum number of rent payments or a minimum monetary amount, and provide financial institutions with a heretofore-unknown service product, which will generate fees for the financial institution as well as providing guarantees to landlords making use of the service product.

To those ends, a computerized system for creating and managing a lease agreement includes a preprogammed lease control computer configured for processing information regarding a potential lessee received from a landlord, the preprogrammed lease control computer being remote from the landlord and operated and controlled by a lease control intermediary, the lease control computer having predetermined data regarding the potential lessee stored therein, and being configured to determine the level of financial risk associated with said potential lessee according to predetermined criteria. The lease control computer is configured to create and produce, upon determination of an acceptable risk level, a physical manifestation of a service product in the form of a guaranty directed to periodic lease payments from said lease control intermediary to said lessor for a predetermined monetary amount defining a guaranty limit, the guaranty limit corresponding to a predetermined time period with said guaranty obligation becoming active upon failure of said potential lessee to pay periodic lease payments.

Preferably, the preprogrammed lease control computer is configured to create and produce, upon determination of an acceptable risk level, a physical manifestation of a lease agreement for execution by said potential lessor, the potential lessee and the lease control intermediary and to create and produce periodic lease payment material directing payment of periodic lease payments to the lease control intermediary whereby, upon execution of the lease agreement, the potential lessee and the potential lessor become lessee and lessor, and the lease control intermediary becomes a guarantor of the lease payments.

It is further preferred that the computerized system for creating and managing a lease agreement further include a landlord computer in communication with the lease control computer for data exchange regarding the potential lessee. Preferably, the computerized system for creating and managing a lease agreement additionally includes a telecommunications link between the landlord computer and the lease control computer.

The lease control computer is preferably configured to determine whether the service product was accepted by the lessor and the lease agreement accepted by the lessor, the lessee and the lease control intermediary, and, if so, to monitor periodic lease payment activity by the lessee to determine whether periodic lease payment has been made by a predetermined date. Further, the lease control computer may be configured to, upon nonreceipt of the periodic lease payment by the predetermined date, add uncollected periodic lease payments to a total amount of outstanding debt for the account of the lessee, and compare the amount of outstanding debt to the predetermined guaranty limit to determine whether the amount of outstanding debt exceeds the predetermined guaranty limit, and if so, the lease control computer is configured to indicate that payment to the lessor an amount in accordance with the service product should be initiated and to initiate collection procedures to recover the amount of the outstanding debt from the lessee.

Additionally, it is preferred that the lease control computer be configured to process the data regarding the potential lessee to determine whether more than one potential lessee exists for a proposed lease and if more than one potential lessee exists, the lease control computer stores the data for all potential lessees by the computer until all potential lessees have submitted the predetermined information. The lease control computer is configured to compare the predetermined information from all potential lessees to a credit allocation model resident in the computer resulting in a collective credit assessment, to determine the guaranty limit based on the collective credit assessment, and to create and produce the service product bearing the guaranty limit.

Preferably, the lease control computer is configured to compare the data from the potential lessee to a credit allocation model resident in the computer to produce a credit assessment, determine the guaranty limit based on the credit assessment and create and produce the service product bearing the guaranty limit. It is further preferred that the lease control computer is configured to determine whether the credit assessment results in declining an applicant, and, if so, the lease control computer is configured to create and produce a letter to the lessee indicating that the lease control intermediary declined to offer a guaranty to the lessor.

It is likewise preferred that the lease control computer is configured to determine whether the periodic lease payments should be directly deposited into a bank account of the lessor, and, if so, the lease control computer is configured to form an automatic periodic lease deposit account in a computer, and to automatically credit the automatic periodic lease deposit account with an amount in accordance with the periodic lease payments less a management fee.

The lease control computer is also preferably configured for processing account information regarding the lessee, the lessor, the lease agreement and the service product: noting dates associated with actual payments and expected payments; designating accounts with payments past due for five days; generating and sending letters to the lessor and the lessee indicating that the fill periodic lease payment was not received; and continuing to monitor the account.

The lease control computer is preferably configured for determining whether a payment has been received within the ten days following the five day past due date and if payment is received, updating the account to reflect payment received and, if no payment is received, generating and sending a second letter to the lessee; and initiating a collection process. Similarly, the lease control computer may be is configured for determining whether payment has been made by the next due date, and, if no payment has been received, comparing an amount of outstanding debt to the guaranty limit, and, if the outstanding debt amount exceeds the guaranty limit, crediting an amount equal to the security deposit to the lessor; closing the account, with no further automatic deposits being made, and generating and sending a letter to the lessor indicating the limit has been achieved. Preferably, the lease control computer is configured for determining whether the limit has not been exceeded and the outstanding debt has not been paid within five days of the next due date, assessing a late fee to the account and generating and sending letters to the lessor and the lessee.

According to the present invention, a method for creating and managing a lease agreement includes the steps of providing first predetermined information regarding a potential lessee and a potential lessor to a lease control intermediary; evaluating the first predetermined information by the lease control intermediary to determine the acceptability of the level of financial risk associated with the potential lessee; creating, upon determination of an acceptable risk level, a service product in the form of a guaranty directed to periodic lease payments from the lease control intermediary to the lessor for a predetermined amount defining a guaranty limit, the guaranty limit corresponding to a predetermined time period with the guaranty obligation becoming active upon failure of the potential lessee to pay periodic lease payments; providing, upon determination of an acceptable risk level, a lease agreement for execution by the potential lessor, the potential lessee, and the lease control intermediary and periodic lease payment material to the lessee directing payment of periodic lease payments to the lease control intermediary whereby, upon execution of the lease agreement, the potential lessee and the potential lessor become lessee and lessor, and the lease control intermediary becomes a guarantor of the lease payments; and depositing periodic lease payments either received from the lessee or made by the lease control intermediary according to the service product into an account held by the lessor, the periodic lease payment having a management fee removed therefrom by the lease control intermediary.

Preferably, the method for creating and managing a lease agreement includes the step of entering data relevant to the lessee, the lessor, the lease agreement and the service product into a computer preprogrammed for account control. It is further preferred that the present invention include the step, to be performed upon acceptance of the service product by the lessor and the lease agreement by the lessee and the lessor, as well as the lease control intermediary, of monitoring periodic lease payment activity by the lessee using the computer to determine whether periodic lease payment has been made by a predetermined date.

It is preferred that the step of monitoring includes, upon nonreceipt of the periodic lease payment by the predetermined date, adding uncollected periodic lease payments to a total amount of outstanding debt for the account of the lessee, and comparing the amount of outstanding debt to the predetermined guaranty limit to determine whether the amount of outstanding debt exceeds the predetermined guaranty limit. Further, the method preferably includes the steps of paying the lessor an amount in accordance with the service product in initiating collection procedures to recover the amount of the outstanding debt.

The method further preferably includes the steps of obtaining a security deposit from the lessee upon execution of the lease agreement and applying the amount of the security deposit to offset any outstanding debt associated with the lessee.

It is further preferred that the step of evaluating the first predetermined information includes determining whether more than one potential lessee exists for a proposed lease using the computer and, if more than one potential lessee exists, storing the first predetermined information for all potential lessees by the computer until all potential lessees have submitted the predetermined information; comparing the predetermined information from all potential lessees to a credit allocation model resident in the computer resulting in a collective credit assessment; determining the guaranty limit based on the collective credit assessment; and preparing the service product with a guaranty limit. Similarly, in the case of one lessee, the step of evaluating the predetermined information includes comparing the predetermined information from the potential lessee to a credit allocation model resident in the computer resulting in a credit assessment determining the guaranty limit based on the credit assessment and preparing the service product with the guaranty limit.

It is further preferred that the method include the steps of determining whether the credit assessment results in a determined guaranty limit sufficiently low to be declined and, if so, issuing a letter from the computer to the lessee indicating that lease control intermediary declined to offer a guaranty to the lessor.

Preferably, the method further includes the step of electing, by the lessor, whether the periodic lease payments should be deposited directly into a bank account of the lessor and, if so, the method further includes the step of creating an automatic periodic lease deposit account in a computer, and the step of depositing periodic lease payments includes automatically crediting the automatic lease deposit account with an amount in accordance with the periodic lease payments less the management fee.

It is further preferred that the step of monitoring periodic lease payment activity includes entering account information regarding the lessee, the lessor, the lease agreement and the service product into a computer; noting dates associated with actual payments and expected payments: designating accounts with payments past due for five days; generating and sending letters to the lessor and the lessee indicating that the fill periodic lease payment was not received; and continuing to monitor the account, all performed by the computer. It is further preferred that the step of monitoring further includes the steps of determining whether a payment has been received within ten days following the five day past due date and, if the payment is received, updating the account to reflect payment received and, if no payment is received, generating and sending a second letter to the lessee: and initiating a collection process. The step of monitoring preferably further includes the step of determining whether payment has been made by the next due date. And, if no payment has been received, comparing an amount of outstanding debt to the guaranty limit, and, if the outstanding debt amount exceeds the product limit, crediting the amount equal to the security deposit to the lessor; closing the account, with no further automatic deposits being made; and generating and sending a letter to the lessor indicating that the limit has been achieved. Preferably, the step of monitoring further includes the steps of, upon a determination that the limit has not be exceeded, and the outstanding debt has not been paid within five days of the next due date, assessing by the computer a late fee to the account and generating and sending letters to the lessor and the lessee or otherwise prompting notification.

The above description of the present invention is suitable for use with any leasehold arrangement regardless of the property involved. It is preferred that, in another embodiment of the present invention, the lessor is a landlord and the lessee is a tenant and the lease payments are rent payments. This embodiment of the invention is particularly useful for housing arrangements such as rental apartments and rental houses.

The invention will now be described by way of example with reference to the accompanying drawings wherein.

According to the preferred embodiment of the computerized system and method of the present invention the system and method for creating and managing a lease agreement assures landlords that at least a portion of the rent payment will be received prior to a tenant moving onto the property. At the outset, it should be understood that while the following discussion of the detailed description of the present invention is directed to land holdings, particularly apartments and houses which constitute rental units, the present invention has far reaching applications. For example, in the transportation area, tractor-trailer leasing can be performed according to the present invention. Similarly, other leasing arrangements can benefit from the application of the method of the present invention.

Figure 1:
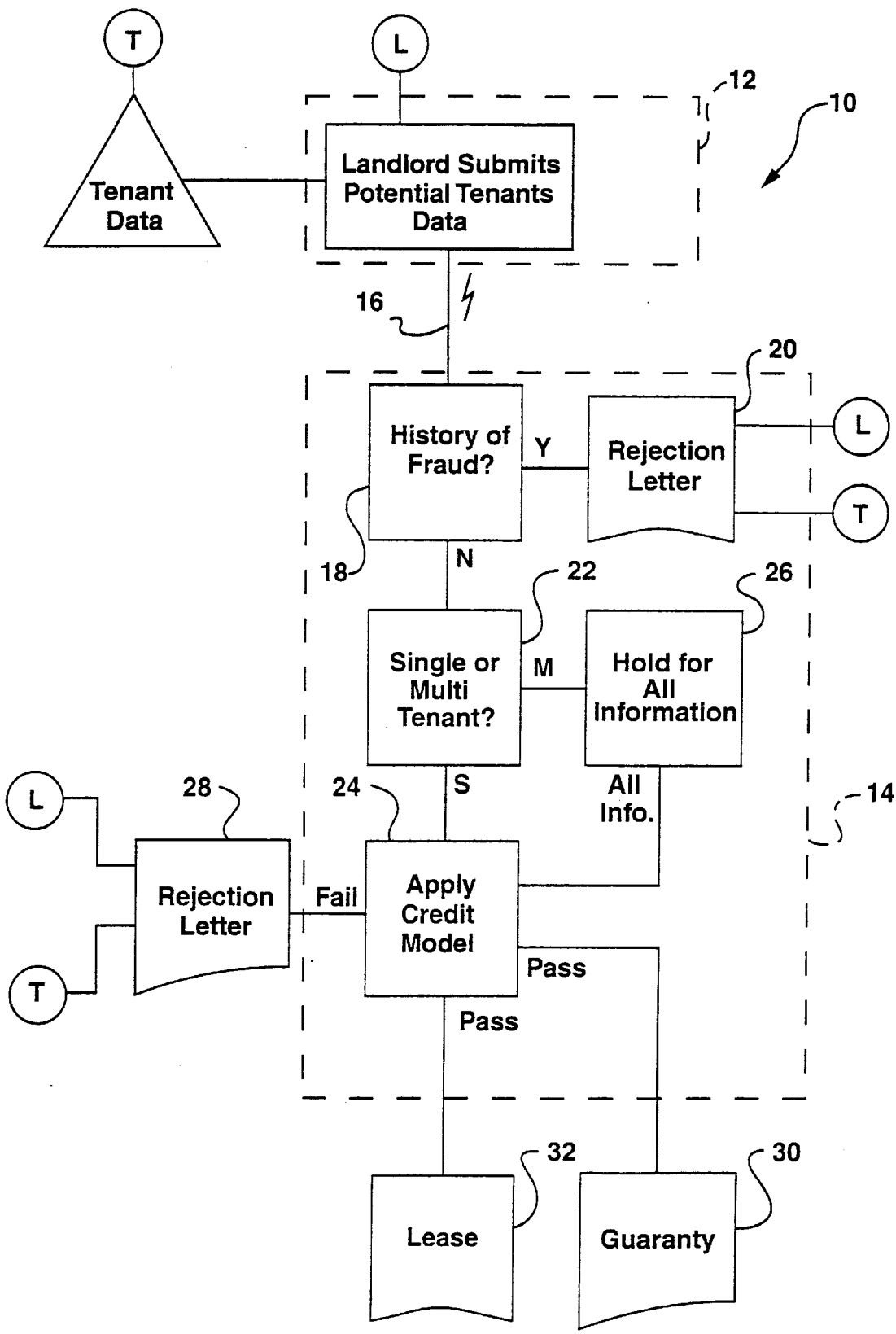
FIG. 1 is a block diagram of a first portion of a computerized system according to the preferred embodiment of the present invention.

With reference to FIG. 1, the present method begins with the creation of a prospective landlord/prospective tenant relationship and the financial evaluation of the prospective tenant. At the outset, the lease control intermediary may initiate an advertising campaign to attract landlords to the new service product. A computerized system for creating and managing a lease agreement is illustrated generally at 10 and includes a lease management computer 14 and, preferably, a landlord computer 12. Once a relationship is formed, a landlord L may be provided with a lease formation data transfer system utilizing the landlord computer 12 and an electronic telecommunications link 16 to, respectively, store and transmit lease formation data to the lease control intermediary, which is preferably a financial institution, for further evaluation, preferably by a lease control computer system 14. The landlord L may also manually gather the necessary data for later input to the lease control computer system 14. The landlord L with a prospective tenant T will contact the lease control intermediary and give the required information on the tenant application as data required by the financial institution. Once this information is provided, the landlord L verifies that the tenant T has signed the application and authorized the financial institution to review the prospective tenant's history. Typically, an application fee will be associated with this process, to be paid by the tenant. The tenant T will also provide the financial institution with the required information to perform a credit check and other financial information as necessary, including employer and income information.

The financial institution will then input the data to the lease control computer 14 from the landlord L, or verify the data received from the telecommunications link 16 with the landlord computer 12 and then, based on the data input, implement a credit check process wherein processing means 18 of the computer will initially check for any indications of fraud attached to the prospective tenant's credit bureau report. If the computer detects any indication of fraud, the computer system 10 will deny the tenant's request and processing means 20 will generate an adverse action letter to be sent to the prospective tenant T and will also notify the landlord L that the service product namely, the guaranty, has been denied. If there arc no indications of fraud, the computer system will initiate processing means 22 to check the information to determine whether there are multiple tenant applications for the rental property. In the case of a single tenant, processing means 24 will apply a credit model, i.e., a predetermined financial data profile, to the prospective tenant's application to determine which service product the financial institution will offer the tenant. If there are multiple tenant applications for the unit, processing means 26 will determine whether all financial information has been provided for each tenant T, and will store the information on hand until it has been determined that all tenant information has been provided. Once all the information is available, the processing means 24 will apply the multiple tenant credit model to the group of applications to determine which product the financial institution will offer to the tenants. If the comparison with the credit model results in declining the applicants, processing means 28 will generate an adverse action letter to the tenant, explaining the reasons they were declined. Once the comparisons of the proposed tenant information with the credit models have occurred, the landlord L will be notified which product the financial institution is able to offer and will request authorization to implement the product.

The service product is in the form of a guaranty agreement 30 wherein the financial institution agrees to provide the landlord L with at least three months or, in the case of a high risk product, a one month guaranty of rent payment regardless of the actions of the tenant or tenants. If the landlord L accepts the product, the lease agreement 32 is initiated, the guaranty 30 is activated, and an account (not illustrated in FIG. 1) for the landlord L and tenant T is set up on the computerized system 10 which will track the flow of payments from the tenant T to the financial institution and from the financial institution to the landlord L.

Once the landlord L has accepted both the tenant and the service product an automated computer system Will monitor the activity relating to the lease agreement and the service product for lease control and management. It should be noted that the computerized system 10 according to the present invention could include one or more actual computers. The lease control computer 14, for example, may be a single unit or may be several computers in electronic, data exchanging communication.

Figure 2:
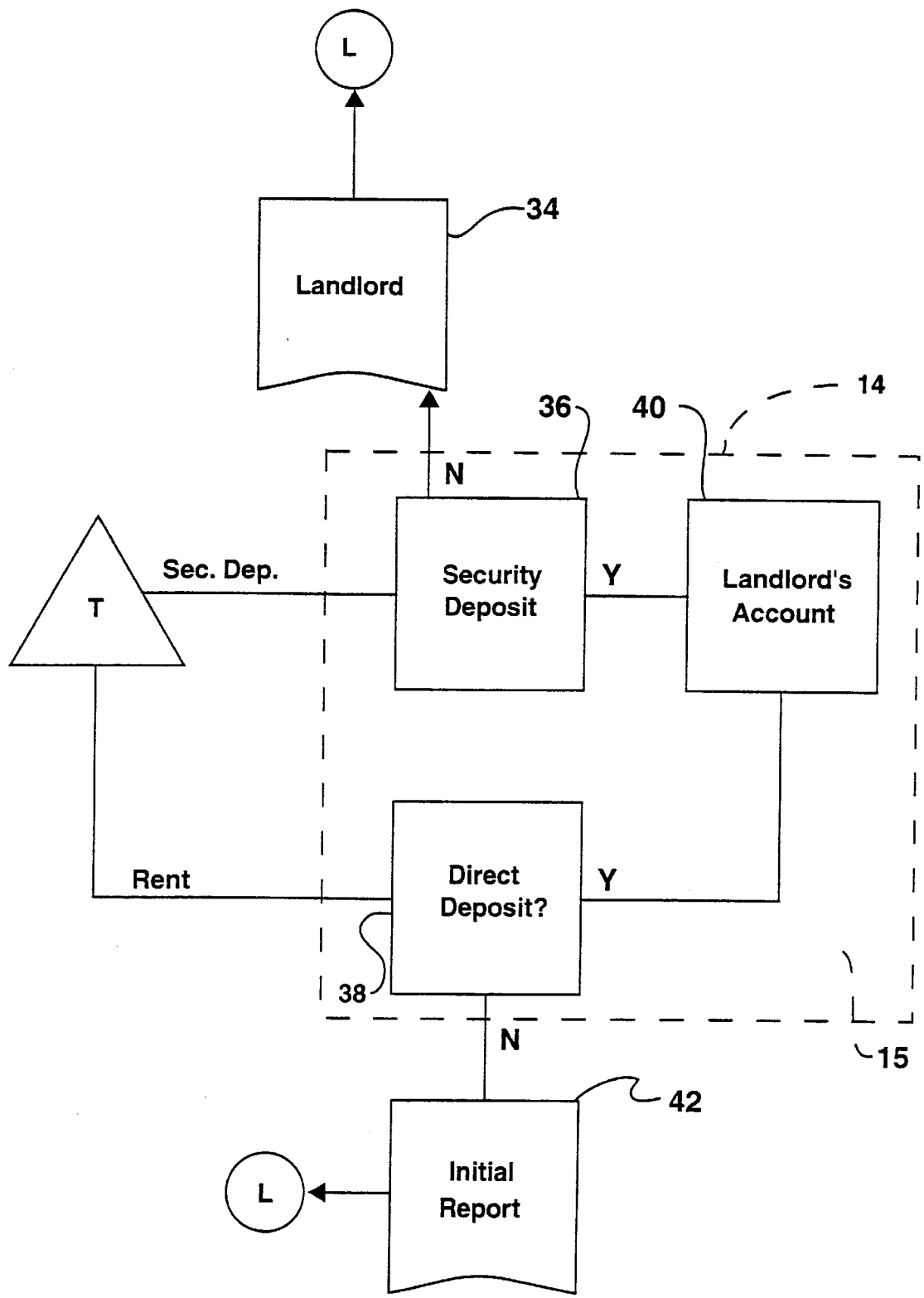
FIG. 2 is a block diagram of a second portion of the computerized system illustrated in FIG. 1.

Turning now to FIG. 2, the landlord L has the option of requesting funds through direct deposit, and, if such a request is made, an account 40 for the landlord L is formed by the computerized system 10 to automatically credit the landlord's account 40 for the rent amount minus the management fee on the same day each month. If the landlord L declines a direct deposit, this is noted in the payment processing subsystem 15 of the lease control computer 14. This information will be double-checked against the lease and service product, and the security deposit and rent checks are logged into the payment processing subsystem 15 and deposited by a remittance processing group. The lease guaranty processing means 30 of the control computer 14 will determine whether the full security deposit has been provided. If this has not been done, the landlord L will be notified and the account will not be activated until the full security deposit has been received. If the landlord L has requested a direct deposit, this account will be blocked from receiving payments until the full security deposit has been received.

If the landlord L has not requested direct deposit, i.e. has requested to be paid by check, the payment processing subsystem 15 will generate an invoice 42 for the amount due to the landlord L each month so that the landlord L will receive the check on or before the day the rent is due. The financial institution will produce and send the checks to the landlord L. Monthly reports also referenced at 42, are also generated detailing the payments made to the landlord L with the reports being reconciled monthly. In managing the lease agreement, the computerized system will monitor activity on a daily basis. If the landlord L has chosen direct deposit, the direct deposit system 38 will scan all accounts in the database each night to look for accounts whose due date is the next day. The system checks to see if the account has a closed account indicator and, if so, the system skips that account and will not make any payment until the account is opened once again.

The system will then scan all accounts that are not closed and create a file of all accounts that should be paid that day including the amount to be paid. The computer system 10 will reformat the file to meet any requirements of any electronic deposit system of any bank that the financial institution uses for direct deposits. At the proper time, the file is electronically transferred to the bank that the financial institution uses for direct deposits and landlord L payments are transferred from the financial institution accounts to the landlord L accounts 40. Once again, monthly reports are generated and the accounts are reconciled monthly.

Figure 3:
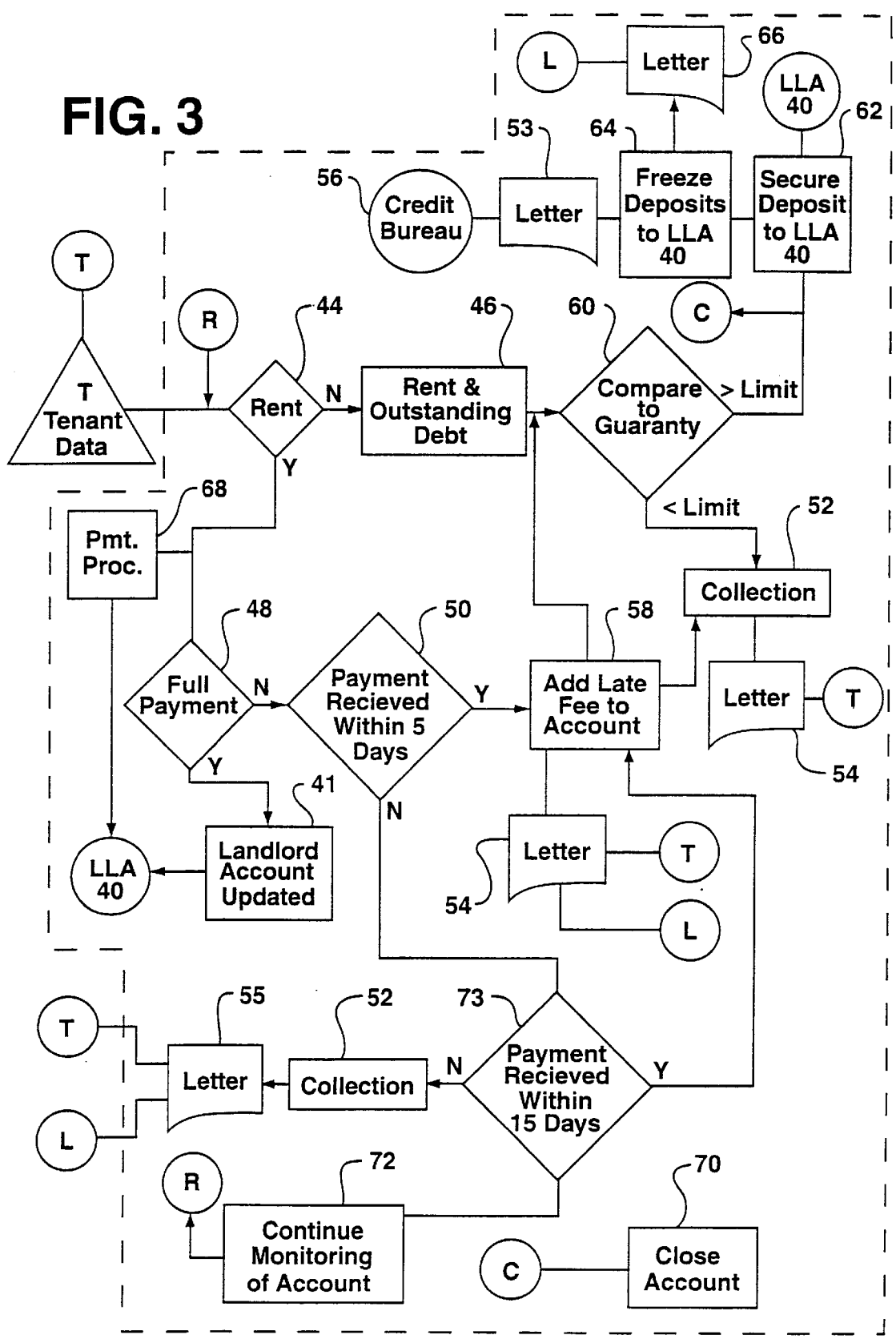
FIG. 3 is a block diagram of a third portion of the computerized system illustrated in FIG. 1.

Referring now to FIG. 3, with respect to the tenant T, the financial institution should receive the monthly rent payment therefrom, and the lease control computer 14 queries, at 44, whether this has occurred. If the payment is not received, the computer system, at 46, adds the amount due for the rent and the total amount of outstanding debt for the tenant account, and automatically assess a late fee to the account and add that amount to the total outstanding debt of the tenant's account. The computer system, at 60, will then compare the total amount of outstanding debt to the product limit, or guaranty limit for the tenant's account. If the total amount of outstanding debt does not exceed the guaranty limit, the account is forwarded to collections 52.

If the amount of outstanding debt exceeds the limit for the account, the system, at 62, credits the funds, which were being held by the financial institution as a security deposit for the landlord L to the account to offset the losses. The system, at 64, will update the automatic deposit accounts so that no additional payments will be made to the landlord L for the tenant's. The computer system 10 will generate and send a letter 66 to the landlord L explaining that the limit for the product has been reached and the account has been closed, therein detailing all of the transaction information for the account. The date of the letter is recorded by the computer system. The computer system will also generate notification 56 to credit bureaus that the tenant T or tenants have defaulted on the debt so that the credit reports can be updated. The computer system will then change the status of the account from active to default and forward the account information to the proper group within the financial institution to initiate collection activity.

If the tenant T pays the rent, the rent check is processed and the payment amount and property to which the payment is to be applied, as well as the date and time the payment was received, are entered into the payment processing subsystem 68 where the checks are batched and deposited. The computer, at 48, will compare the amount received to the total amount due. If the payment is full for the rent, then the system, at 41, classifies the account as current and a reconciliation report is generated for the total amount of rent received. If the amount is less than the total amount due, and the grace period of five days past the due date has past, the system, at 58, assesses a late fee to the account and adds that amount to the outstanding debt of the account. The lease control computer 14 will also generate a letter 54 to the tenant T informing the tenant T that the full amount of the rent was not received, that a late fee has been assessed, and reminding them of the total amount outstanding for their account. The system will also generate a letter 54 to the landlord L informing them that the tenant T did not fully pay. The computerized system 10 will then record the dates the letters were sent. Once again, the computerized system 10 will compare, at 60, the total amount of outstanding debt to the product limit for that specific account. If the total amount of outstanding debt does not exceed the limit, then the account is forwarded to collections 52 and a collection process, illustrated at 58, is initiated. If the amount of outstanding debt exceeds the limit for the account, the system credits the funds, which were being held by the financial institution as a security deposit for the landlord L to the account to offset the loss. The computer system 10 will then close the account, illustrated at 70, and generate a letter 66 to the landlord L explaining that the guaranty limit has been reached, and that the account has been closed. Details of all of the transaction information for the account are provided. The computerized system 10 will also generate notification to the credit bureaus 56 that the tenant T or tenants have defaulted on the debt so that the credit reports can be updated accordingly. Again, the computer system will change the status of the account from active to default and forward the account information to the proper group to initiate collection procedures.

Information on all accounts delinquent five days after the due date for rent is subject to collection procedure 58 and the computerized system 10 will update the accounts to delinquent status from current. The system will check to see if initial letters have been sent to the landlord L and tenant T or tenants to inform them that the account is delinquent. If the letters have not been sent, the system generates a letter 54 to the tenant T informing them that the full amount of their rent was not received, that a late fee has been assessed and informing them of the total amount outstanding on their account. Once again, the computer will generate a letter to the landlord L informing him that the tenant T did not fully pay. The system, at 73, will monitor whether any payments are made to the account within the next ten days thusly being fifteen days beyond the due date. If payments are received, the system compares the amount received to the amount due and if the payment matches or exceeds the amount due, minus the late fee, the system generates a letter to the landlord L informing the landlord L that the tenant T or tenants are current. The system records the date the letter was sent and updates the account information to reclassify the account as current.

If payment is not received within the next ten days, i.e. fifteen days after the due date, or the payment received is less than the amount due, a second delinquency letter 55 to the tenant T is provided by the system and another notification to the landlord L is also provided by the system. The computerized system 10 records the date of the letters and also notifies the collections group to initiate collection procedures, illustrated at 52. The system, at 72, continues to monitor the account regarding whether any payments are made thereto. If, by the next rental due date, full payment has been received for the outstanding debt, then the system generates another letter to the landlord L informing the landlord L that the tenant T is current. The system will record when the letter was dispatched. Once again, the system will update and reclassify the account as current. If the fill debt has not been paid by the next rental due date, the system, at 60 compares the outstanding debt to the guaranty limit for the account. If the amount of outstanding debt exceeds the limit for the account, the system credits the funds from the security deposit to the account to offset the loss and updates the automatic deposit system, if in place, so that no additional payments will be made to the landlord L automatically on the account. The computerized system 10 will generate a letter 66 to the landlord L explaining that the guaranty limit has been reached and the account has been closed, illustrated at 70, detailing all of the transaction information for that account. Once again, the date of the letter is recorded by the computerized system 10. Again, the system will also notify the credit bureaus 56 of the defaulted debt so that credit reports associated with the tenant T or tenants can be updated accordingly. The computer system changes the account status from active to default and then forwards the account information to the proper group for collections.

If the guaranty limit has not been exceeded, and the tenant T has not paid off the outstanding debt within five days of the next rent due date, the computerized system 10 will, at 58, assess a late fee to the account and add that amount to the total outstanding debt of the account. The system will also generate a letter 54 to the tenant T informing them that the full amount of the rent was not received, that a late fee has been assessed, and informing them of the total amount of outstanding debt remaining on the account. The computerized system 10 will then generate a letter 66 to the landlord L informing the landlord L that the tenant T did not fully pay and record the date on which these letters were sent. Once again, a collection process 52 would be initiated. The computer system 10 will continually monitor the status of the account, whether payments are received, and directing the collection process until the account becomes current or is closed.

As can be seen from the detailed description above, the method of the present invention is carried out by the computerized system once the agreements have been executed and the accounts set up. The computerized system tracks payments and applies the payment in the proper location and can fully manage the lease accounts on behalf of the financial institution. Prior to setting up any accounts, the financial institution, having the incentive to generate accounts which operate according to the method of the present invention, can monitor classified advertisements for properties and can initiate advertising and direct calling procedures to recruit landlords and tenants for the system. Therefore, the present invention provides a new and unique computerized system and method that may be utilized by financial institutions, which will benefit every party involved, with the system receiving and processing data in such a way as to enable it to perform the tasks of a lease control intermediary and communicating with both the landlord and tenant.

Those persons skilled in the art will therefore readily understand that the present invention is susceptible of a broad utility and application. Many embodiments and adaptations of the present invention other than those herein described, as well as many variations. modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof. For example, although the description makes reference to a lease agreement between a landlord and a tenant, the invention is also applicable to the leasing of any other type of property involving a lessor and a lessee, and the term "lease agreement" and "lease payments" are also intended to encompass "rental agreements" and "rent payments" respectively.

We claim:

1. A computerized system for creating and managing a lease agreement comprising:

a preprogrammed lease control computer including means for processing information regarding a potential lessee, said preprogrammed lease control computer being remote from the lessor and being operated to carry out tasks of a lease control intermediary, said lease control computer having means for storing predetermined data regarding the potential lessee, means to determine the level of financial risk associated with said potential lessee according to predetermined criteria to create and produce, upon determination of an acceptable risk level, a physical manifestation of a service product in the form of a guaranty directed to periodic lease payments received from an actual lessee by said lease control intermediary for payment from said lease control intermediary to said lessor, said guaranty being for a predetermined monetary amount defining a guaranty limit corresponding to a predetermined time period with said guaranty obligation becoming active upon failure of said potential lessee to pay periodic lease payments.

2. A computerized system for creating and managing a lease agreement according to claim 1, wherein said preprogrammed lease control computer includes means to create and produce, upon determination of an acceptable risk level, a physical manifestation of a lease agreement for execution by said potential lessor, said potential lessee and said lease control intermediary, and to create and produce periodic lease payment material directing payment of periodic lease payments to said lease control intermediary whereby, upon execution of said lease agreement, said potential lessee and said potential lessor become lessee and lessor, and said lease control intermediary becoming a guarantor of the lease payments.

3. A computerized system for creating and managing a lease agreement according to claim 1 and further comprising a lessor computer in communication with said lease control computer for data exchange regarding said potential lessee.

4. A computerized system for creating and managing a lease agreement according to claim 3 and further comprising a telecommunications link between said lessor computer and said lease control computer.

5. A computerized system for creating and managing a lease agreement according to claim 1 wherein said lease control computer includes means to determine whether said service product was accepted by said lessor and said lease agreement accepted by said lessor, said lessee and said lease control intermediary, and, if so, to monitor periodic lease payment activity by said lessee to determine whether periodic lease payment has been made by a predetermined date.

6. A computerized system for creating and managing a lease agreement according to claim 5, wherein said lease control computer includes means to, upon nonreceipt of said periodic lease payment by said predetermined date, add uncollected periodic lease payments to a total amount of outstanding debt for an account of said lessee, and means to compare said amount of outstanding debt to said predetermined guaranty limit to determine whether said amount of outstanding debt exceeds said predetermined guaranty limit, and means to indicate if said amount of outstanding debt does exceed said predetermined guaranty limit, and to initiate collection procedures to recover the amount of said outstanding debt from said lessee.

7. A computerized system for creating and managing a lease agreement according to claim 1, wherein said lease control computer includes means to process said data regarding said potential lessee to determine whether more than one potential lessee exists for a proposed lease and if more than one potential lessee exists, to store said data for all potential lessees by said computer until all potential lessees have submitted said predetermined information, said lease control computer also including means to compare said predetermined information from all potential lessees to a credit allocation model resident in said computer resulting in a collective credit assessment and to determine said guaranty limit based on said collective credit assessment; and to create and produce said service product bearing said guaranty limit.

8. A computerized system for creating and managing a lease agreement according to claim 1, wherein said lease control computer includes means to compare said data from said potential lessee to a credit allocation model resident in said computer, to produce a credit assessment, determine said guaranty limit based on said credit assessment and create and produce said service product bearing said guaranty limit.

9. A computerized system for creating and managing a lease agreement according to claim 7 wherein said lease control computer includes means to determine whether said credit assessment results in declining an applicant, and, if so, said lease control computer includes means to create and produce a letter to said potential lessee indicating that the lease control intermediary declined to offer a guaranty to the potential lessor.

10. A computerized system for creating and managing a lease agreement according to claim 1, wherein said lease control computer includes means to determine whether said periodic lease payments should be directly deposited into a bank account of said lessor, and, if so, said lease control computer is configured to form an automatic periodic lease deposit account, and automatically credit said automatic periodic lease deposit account with an amount in accordance with said periodic lease payments less a management fee.

11. A computerized system for creating and managing a lease agreement according to claim 1, wherein said lease control computer includes means for processing account information regarding said lessee, said lessor, said lease agreement and said service product; means for noting dates associated with actual payments and expected payments; means for designating accounts with payments past due for five days; means for generating and sending letters to said lessor and said lessee indicating that the full periodic lease payment was not received; and means for continuing to monitor said account.

12. A computerized system for creating and managing a lease agreement according to claim 11, wherein said lease control computer includes means for determining whether a payment has been received within the ten days following said five days past due date and if payment is received, updating said account to reflect payment received and, if no payment is received, generating and sending a second letter to said lessee; and initiating a collection process.

13. A computerized system for creating and managing a lease agreement according to claim 12, wherein said lease control computer includes means for determining whether payment has been made by a next regular periodic due date, means for comparing if no payment has been received, an amount of outstanding debt to said guaranty limit, means for crediting if said outstanding debt amount exceeds said guaranty limit, an amount equal to a security deposit to said lessor; means for closing the account, with no further automatic deposits being made; and means for generating and sending a letter to said lessor indicating said limit has been achieved.

14. A computerized system for creating and managing a lease agreement according to claim 13, wherein said lease control computer includes means for determining whether said limit has not been exceeded and the outstanding debt has not been paid within five days of the next regular periodic due date, means for assessing a late fee to said account, and means for generating and sending letters to said lessor and said lessee.

15. A computerized system for creating and managing a lease agreement according to claim 2 wherein said service product includes regular periodic intermediary payments to be paid by said lease control intermediary to said lessor no later than a regular periodic due date, said regular periodic intermediary payments being substantially equivalent to said periodic lease payments less a management fee, and wherein said lease control computer includes means for determining that said regular periodic intermediary payments are due.

16. A computerized system for creating and managing a lease agreement according to claim 15 wherein said lease control computer includes means for creating invoices for said regular periodic intermediary payments, whereby said invoices may be created in advance of said regular periodic due date to assure timely payment to said lessor.

17. A computerized system for creating and managing a lease agreement according to claim 15 wherein said lease control computer includes means for automatically depositing said regular periodic intermediary payments into a bank account of said lessor, and means for determining whether said regular periodic intermediary payments should be deposited directly into said bank account.

* * * * *

UNITED STATES PATENT AND TRADEMARK OFFICE
CERTIFICATE OF CORRECTION

PATENT NO. : 6,023,687
DATED : February 8, 2000
INVENTOR(S) : James E. Weatherly and Charles R. Carey It is certified that error appears in the above-identified patent and that said Letters Patent is hereby corrected as shown below:

On the title page: Abstract, line 13, delete "lime" and insert --time--.

Column 6, line 29, delete "arc" and insert therefor: --are--.

Signed and Sealed this

Twenty-eighth Day of November, 2000

Attest:

Q. TODD DICKINSON

*Attesting Officer*  *Director of Patents and Trademarks*